United States Patent Office 2,816,117
Patented Dec. 10, 1957

2,816,117

SYNTHESIS OF TERPENOID MATERIALS

John D. Cawley, Rochester, N. Y., assignor to Eastman Kodak Company, Rochester, N. Y., a corporation of New Jersey No Drawing. Application January 5, 1951, Serial No. 204,691

24 Claims. (Cl. 260—340.9)

This invention relates to the synthesis of terpenoid materials and is particularly concerned with methods of adding an isopentane or isopentene group or groups to a carbonyl compound.

There are a number of so-called terpenoid materials, that is, materials containing one or more isopentane or isopentene groups which are of great commercial value. Thus, for example geraniol of the formula $$CH_3-\underset{\underset{CH_3}{|}}{C}=CHCH_2CH_2\underset{\underset{CH_3}{|}}{C}=CH-CH_2OH$$

and farnesol of the formula $$CH_3-\underset{\underset{CH_3}{|}}{C}=CHCH_2CH_2\underset{\underset{CH_3}{|}}{C}=CHCH_2CH_2\underset{\underset{CH_3}{|}}{C}=CH-CH_2OH$$

are of great value in the perfumery art, while phytol $$CH_3-\underset{\underset{CH_3}{|}}{C}H-CH_2CH_2CH_2\underset{\underset{CH_3}{|}}{C}HCH_2CH_2CH_2\underset{\underset{CH_3}{|}}{C}HCH_2CH_2CH_2\underset{\underset{CH_3}{|}}{C}=CH-CH_2OH$$

is an essential intermediate for both chlorophyll and vitamin E. Heretofore, the synthesis of these and other terpenoid materials has involved methods which were lengthy, laborious and uneconomical; and, as a consequence, the terpenoid materials used by the chemical industry were either natural isolates or were prepared from natural isolates and were very costly.

Previous synthetic methods had several distinct disadvantages. One disadvantage was that too few carbon atoms were introduced at each stage in the synthesis so that the synthesis of a long-chain compound such as phytol involved a large number of steps. Another disadvantage of many prior methods was that a functional group was not introduced which could function in further chain-lengthening reactions. Another disadvantage was that unsaturated linkages were either not introduced at all or introduced in the wrong position. A further disadvantage was that the reagents were either expensive or difficult to prepare.

It is accordingly, an object of this invention to provide new and improved methods of synthesizing terpenoid materials.

It is also an object of this invention to provide a simple method of increasing the chain length of a carbonyl compound by the introduction of an isopentane or isopentene group into said carbonyl compound.

Another object of the invention is to simplify the synthesis of long-chain terpenoid materials.

Another object of the invention is to provide a method of increasing the chain length of a carbonyl compound by introducing an isopentane or isopentene group into said carbonyl compound and producing a ketone of increased chain length having a ketonic carbonyl group which is readily amenable to further chain-lengthening reactions.

Another object of the invention is to provide an improved method of synthesizing unsaturated terpenoid materials containing one or more consecutive $$CH_3$$
$$-\underset{|}{C}=CHCH_2CH_2-$$

groups.

Another object of the invention is to provide an improved method of synthesizing intermediates which are readily convertible to geraniol, farnesol, or similar perfumery constituents of the unsaturated terpenoid series.

Another object of the invention is to facilitate the synthesis of terpenoids such as chlorophyll and vitamin E by providing improved methods of synthesizing phytol intermediates.

Other objects will be apparent from the description and claims which follow.

These and other objects are attained by means of this invention which provides new synthesis and products overcoming disadvantages of prior methods of synthesizing terpenoid materials, the invention being described in detail hereinafter with particular reference to certain preferred embodiments thereof.

As one aspect of this invention, I have discovered that a ketal of 5-halo-2-pentanone reacts with an active metal such as magnesium, lithium, zinc, cadmium or mercury to form an organo-metallic complex, and that such organo-metallic complex reacts with an aldehyde or a ketone to form a δ-carbinol. The carbinol can thereafter be dehydrated to the corresponding γ,δ-unsaturated ketal of substantially longer chain length than the original ketal, which γ,δ-unsaturated ketal, upon hydrolysis, yields the corresponding unsaturated ketone and which γ,δ-unsaturated ketal, upon hydrogenation and hydrolysis, yields the corresponding saturated ketone.

The ketals employed in practising the invention include both the simple ketals of the formula $$XCH_2CH_2CH_2\underset{\underset{CH_3}{|}}{C}\underset{\diagdown O-Alkyl}{\diagup O-Alkyl}$$

wherein X is a halogen atom, which simple ketals are readily prepared by reacting 5-halo-2-pentanone with an alkyl orthoformate in the presence of an alcohol, and the preferred cyclic alkylene ketals of the formula $$XCH_2CH_2CH_2\underset{\underset{CH_3}{|}}{C}\underset{\diagdown O \diagup}{\diagup O \diagdown}R''$$

wherein R" is an alkylene group, such cyclic alkylene ketals being readily prepared by reacting 5-halo-2-pentanone with a 1,2- or 1,3-glycol.

I have found that such ketals, whether simple or cyclic, react with an active metal and form and organo-metallic complex. With lithium as the active metal, the lithium substitutes for the halogen atom in the 5-position on the ketal, the other metals, magnesium, zinc, cadmium and mercury form an organo-halometallic complex of the formula $$XMCH_2CH_2CH_2\underset{\underset{CH_3}{|}}{C}\underset{\diagdown O-Alkyl}{\diagup O-Alkyl}$$

with the simple ketals, or $$XMCH_2CH_2CH_2\underset{\underset{CH_3}{|}}{C}\underset{\diagdown O \diagup}{\diagup O \diagdown}R''$$

with the cyclic ketals where M is a metal atom.

For simplicity, the invention will be described hereinafter with particular reference to the preferred cyclic alkylene ketals and the organo-halometallic complexes formed therefrom. It will be understood, however, that it is not intended that the invention be limited thereby and that the simple alkyl ketals, such as the methyl, ethyl, propyl, butyl and similar alkyl ketals can be employed in place of the cyclic alkylene ketals and that the organo-metallic lithium complex can be used as effectively as the organo-halometallic complexes formed by the other active metals.

To illustrate the invention in a preferred embodiment, a cyclic alkylene ketal of 5-halo-2-pentanone, such as 2-(γ-halopropyl)-2-methyl-1,3-dioxolane, reacts with an active metal to form an organo-halometallic compound of the formula $$XMCH_2CH_2CH_2\underset{O}{\overset{CH_3\phantom{x}O}{C}}\!\!\diagdown\!\!R''$$

wherein X is a halogen atom, M is the active metal, and R" is an alkylene group, and that such organo-halometallic compound reacts with an aldehyde or a ketone of the formula $$R-\underset{R'}{\overset{\phantom{x}}{C}}=O$$

wherein R is a hydrocarbon radical and R' is either hydrogen or a hydrocarbon radical to form a carbinol of the formula $$R-\underset{\underset{OH}{|}}{\overset{R'}{\underset{|}{C}}}-CH_2CH_2CH_2\underset{O}{\overset{CH_3\phantom{x}O}{C}}\!\!\diagdown\!\!R''$$

The carbinol can thereafter be dehydrated to the compound $$R-\underset{}{\overset{R'}{C}}=CHCH_2CH_2\underset{O}{\overset{CH_3\phantom{x}O}{C}}\!\!\diagdown\!\!R''$$

which, upon hydrolysis, yields the unsaturated ketone $$R-\overset{R'}{C}=CHCH_2CH_2\overset{CH_3}{C}=O$$

and which, upon hydrolysis and hydrogenation, yields the saturated ketone $$R-\overset{R'}{CH}-CH_2CH_2CH_2\overset{CH_3}{C}=O$$

Such ketones contain a functional ketonic carbonyl group whereby they can thereafter be again reacted with 2(γ-halopropyl)-2-methyl-1,3-dioxolane or similar ketal as set forth herein to introduce a second isopentane or isopentene group or subjected to other reactions utilizing ketones such as Reformatsky reaction or the like.

Thus, by means of a ketal of 5-halo-2-pentanone as particularly exemplified by a cyclic alkylene ketal of 5-halo-2-pentanone, a five-membered hydrocarbon group is readily introduced into a carbonyl compound by first forming an organo-halometallic compound and reacting such compound with a carbonyl compound such as an aldehyde or a ketone. This behavior of the ketals of 5-halo-2-pentanone is anomolous in view of the fact that Arens and Van Dorp have shown that the halogenated cyclic ketal $$XCH_2\underset{O-CH_2}{\overset{CH_2\phantom{x}O-CH_2}{C}}\!\!\diagdown\!\!\phantom{xx}$$

will not form an organo-halometallic compound with an active metal such as magnesium or the like (Rec. trav. chim., 65, 729 (1946)), and Willimann and Schinz, Helv. Chim. Acta, 32, 2158 (1949), have shown that the cyclic ketal $$XCH_2CH_2\underset{O-CH_2}{\overset{CH_2\phantom{x}O-CH_2}{C}}\!\!\diagdown\!\!\phantom{xx}$$

and its organo-metallic derivatives react unlike the compounds utilized in the present invention.

In practising this invention, the organo-metallic compound set out hereinabove can be prepared from any of the ketals of 5-halo-2-pentanone. Thus in the compound of the formula $$XCH_2CH_2CH_2\underset{O}{\overset{CH_3\phantom{x}O}{C}}\!\!\diagdown\!\!R''$$

or in the compound of the formula $$XCH_2CH_2CH_2\overset{CH_3}{\underset{}{C}}\!\!\diagup\!\!\overset{O-Alkyl}{\underset{O-Alkyl}{}}$$

X can be any of the halogens with chlorine and bromine being preferred. Similarly, R" can be any alkylene radical derived from a 1,2- or 1,3-glycol such as ethylene, propylene, butylene or similar alkylene radical since the ketal group does not enter into nor affect the course of the reactions embodying the invention, and the cyclic ketal group is subsequently hydrolyzed to a carbonyl group. For convenience and economy, a lower cyclic propylene ketal is preferred. In like manner, the alkyl groups can be any of the well-known alkyl radicals such as methyl, ethyl, propyl, butyl or other alkyl radicals, the lower alkyl radicals having from 1 to 4 carbon atoms being preferred.

The ketals of 5-halo-2-pentanone are readily prepared by reacting an alkaline metal derivative of ethyl acetoacetate with ethylene oxide gas to form α-acetobutyrolactone, reacting such lactone with hydrogen halide to form 5-halo-2-pentanone, and ketalizing the latter compound with an alkylene glycol or an alkyl orthoformate to form the corresponding ketal of 5-halo-2-pentanone. Thus for example, the preparation of 2-(γ-halopropyl)-2-methyl-1,3-dioxolane is represented graphically by the following equations.

$$CH_3-CO-\overset{X}{\underset{|}{CH}}-CO_2C_2H_5 + CH_2\!\!-\!\!CH_2 \longrightarrow CH_3\overset{O}{\overset{\|}{C}}CH\!\!-\!\!\overset{O}{\underset{}{C}}\!\!\diagdown\!\!\overset{O}{\underset{CH_2-CH_2}{}}$$

Equation 1

$$CH_3\overset{O}{\overset{\|}{C}}CH\!\!-\!\!\overset{O}{\underset{}{C}}\!\!\diagdown\!\!\overset{O}{\underset{CH_2-CH_2}{}} + HX \longrightarrow XCH_2CH_2CH_2\overset{CH_3}{\underset{}{C}}=O$$

Equation 2

$$XCH_2CH_2CH_2\overset{CH_3}{\underset{}{C}}=O + HOCH_2CH_2OH \longrightarrow XCH_2CH_2CH_2\overset{CH_3}{\underset{}{C}}\!\!\diagup\!\!\overset{O-CH_2}{\underset{O-CH_2}{}}$$

Equation 3

The hydrogen halide (HX) in Equation 2 may be any of the well-known hydrogen halides but is preferably hydrogen chloride or hydrogen bromide for best results. Similarly, the alkylene glycol in Equation 3 can be ethylene glycol as shown or it can be 1,2-propylene glycol, butylene glycol, trimethylene glycol or the like alkylene glycols.

The cyclic alkylene ketal of 5-halo-2-pentanone is thereafter reacted with an active metal, preferably magnesium, lithium, cadmium, zinc, or mercury to form the corresponding organo-metallic compound, the reaction proceeding satisfactorily with or without an initiator such as methyl iodide. This reaction proceeds as follows with active metals other than lithium, lithium acting in similar fashion except that it replaces the halogen atom:

$$XCH_2CH_2CH_2\underset{O}{\overset{CH_3\phantom{x}O}{C}}\!\!\diagdown\!\!R'' + M \rightarrow XMCH_2CH_2CH_2\underset{O}{\overset{CH_3\phantom{x}O}{C}}\!\!\diagdown\!\!R''$$

or, with the product of Equation 3, as follows:

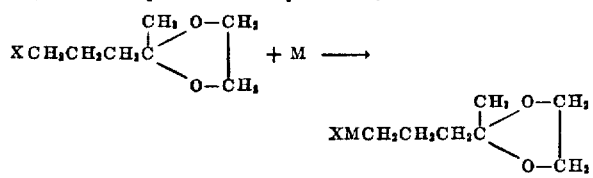

Equation 4

The organo-metallic compounds, such as the organo-halometallic product of Equation 4, is thereafter reacted with a carbonyl compound which can be either an aldehyde or a ketone. Only the carbonyl group enters into the reaction, and therefore any compound of the formula

can be employed wherein R is a hydrocarbon radical and R' is either hydrogen or a hydrocarbon radical, since the nature of the hydrocarbon radicals does not affect the course of the reaction. In preparing terpenoid materials, the carbonyl compound is usually an alkyl ketone and preferably a methyl ketone,

The hydrocarbon radical R is preferably an aliphatic radical, typical examples of aliphatic methyl ketones which are employed being dimethyl ketone in the synthesis of geraniol or farnesol or the like, or methylheptenone in the synthesis of farnesol, or pseudo-ionone in the synthesis of phytol.

The reaction between the organo-metallic compound and the carbonyl compound produces a carbinol of substantially increased chain length, as typified by the reaction with the organo-halometallic complex of a cyclic alkylene ketal:

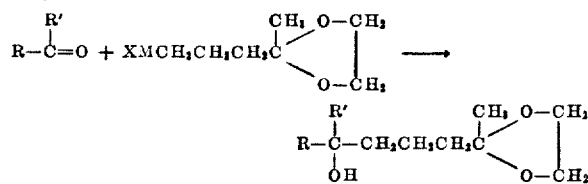

Equation 5

This reaction is readily effected by adding a solution of the carbonyl compound to a solution of the organo-metallic compound in a suitable solvent, such as dry ether. An exothermic reaction begins immediately and proceeds to completion in good yield. Dilution of the reaction mixture with water decomposes any metal complex present to the desired carbinol.

The carbinol is then converted to a ketone which contains one more isopentene or isopentane unit than the original carbonyl compound. In effecting the conversion, the carbinol is subjected to dehydration and hydrolysis to produce an unsaturated ketone or to dehydration, hydrogenation and hydrolysis to produce a saturated ketone, such reactions being effected in any desired order.

Dehydration of the carbinol is readily effected in accordance with well-known dehydration practice as for example, by heating the carbinol with an acidic material such as an acid or acid salt or similar dehydrating agent. Typical dehydrating agents which are suitably employed include the mineral acids, organic acids such as oxalic acid and p-toluenesulfonic acid, anhydrides such as acetic anhydride, and acid salts such as zinc chloride, phosphorous trichloride, oxalyl chloride, phosphorous oxychloride and the like.

Hydrolysis of the dehydrated ketal to the corresponding ketone is readily effected with aqueous acid or in accordance with other well-known hydrolysis practice, dilute aqueous mineral acids being preferred for convenience.

When a saturated ketone, such as phytyl ketone is desired, hydrogenation is employed for saturation of the unsaturated linkages. Hydrogenation is readily effected by treatment with hydrogen gas under slight pressure as for example from 20 to 50 p. s. i. in the presence of a hydrogenation catalyst such as Raney nickel, platinum oxide, palladium or the like.

In the synthesis of a compound which is readily converted to geraniol, a preferred process in accordance with this invention is as follows. Dimethyl ketone is reacted with an organo-metallic compound as described hereinabove. Any of the compounds described can be employed, the reaction being illustrated graphically by the following specific equation using an organo-halometallic complex wherein the halogen is chlorine and the metal is magnesium and the compound is a cyclic ethylene ketal.

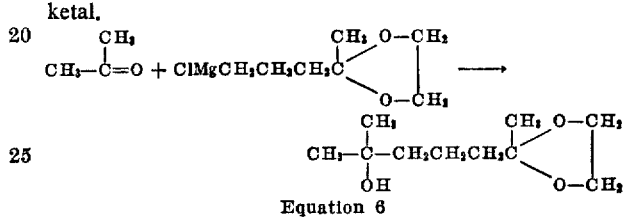

Equation 6

The carbinol of Equation 6 is then dehydrated to an unsaturated cyclic ketal by heating it with an acidic material such as phosphorous oxychloride and pyridine or similar dehydrating agent as follows:

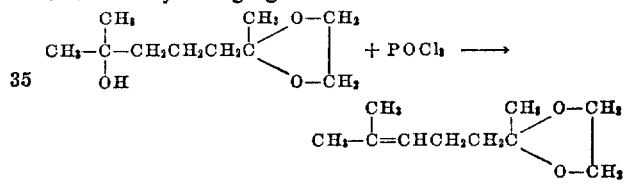

Equation 7

This unsaturated cyclic ketal is then hydrolyzed to the corresponding unsaturated ketone with aqueous acid.

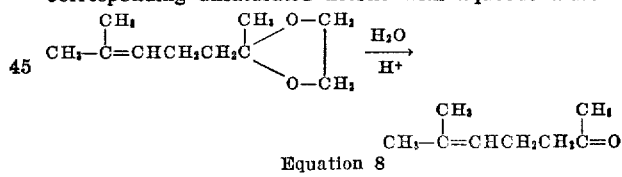

Equation 8

Thus, the chain length of the dimethyl ketone has been increased by an isopentene group. The unsaturated ketone (methyl-heptenone) produced in Equation 8 is thereafter readily converted to geraniol by subjecting such ketone to a Reformatsky reaction with a haloacetate to form an ester of geranic acid followed by reduction of said ester to geraniol by a suitable reduction process as for example by treating the ester with an ether soluble metal hydride such as lithium aluminohydride, lithium borohydride, aluminum hydride or the like.

The synthesis of farnesol is facilitated by processes embodying this invention in like manner. The unsaturated ketone as produced in Equation 8 is reacted with a metal complex of the cyclic alkylene ketal of 5-halo-2-pentanone. A typical reaction employing a lithium organo-metallic complex of the cyclic ethylene ketal is as follows:

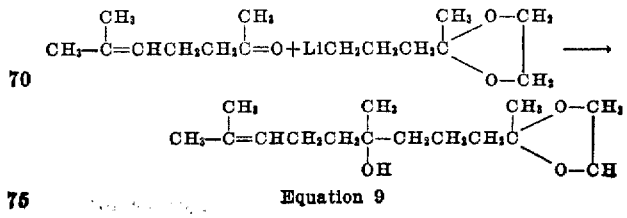

Equation 9

The carbinol produced in Equation 9 is then dehydrated with an acidic dehydrating agent and hydrolyzed with aqueous acid as described hereinabove, the composite reaction being shown in the following equation:

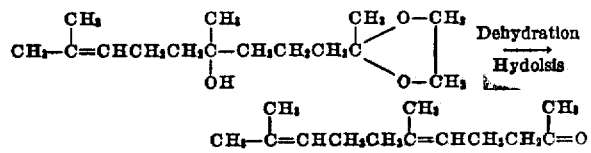

Equation 10

As can be seen, the unsaturated ketone of Equation 10 differs from farnesol in the manner that the ketone of Equation 8, methylheptenone, differed from geraniol; and in like manner the ketone of Equation 10 is readily converted to farnesol by subjecting it to a Reformatsky reaction with a haloacetate and reducing the resulting ester to farnesol.

Phytyl ketone can be prepared from the unsaturated ketone shown in Equation 10 by reacting such ketone with a metal complex of a ketal of 5-halo-2-pentanone as described hereinabove to add another isopentene group, following which the entire compound is saturated by catalytic hydrogenation as described hereinabove. Phytyl ketone is converted to phytol in accordance with the previously described process of a Reformatsky reaction followed by reduction of the resulting ester to phytol.

Phytol ketone is more readily synthesized in accordance with this invention, however, by reacting pseudoionone with a metal complex prepared from a ketal of 5-halo-2-pentanone. Thus for example, with the chloromagnesium complex of a cyclic ethylene ketal embodying the invention, the reaction proceeds as follows:

On hydrolysis with aqueous acid such as dilute hydrochloric acid, the product of Equation 13 is hydrolyzed to phytyl ketone.

The following detailed examples illustrate a process comprising a preferred embodiment of the invention although it will be understood that such examples are not intended to limit the scope of the invention.

*Example 1*

As the initial step in preparing a ketal of a 5-halo-2-pentanone, 1 mole of potassium hydroxide and 200 ml. of diethyl carbitol were charged into a 1 l., 3-neck flask equipped with a sealed stirrer, dropping funnel and exit tube connected to a distillation condenser. This mixture was heated and stirred until the carbitol distilled, and distillation was continued until the vapor temperature reached 180° C., fresh carbitol being added to replace that lost by distillation. The mixture was then stirred vigorously and cooled to about 10° C. To the mixture was slowly added 135 g. of ethyl acetoacetate while the mixture was being stirred. The exit tube was replaced by a reflux condenser cooled with a Dry Ice-acetone mixture, and the dropping funnel was replaced by a thermometer and a gas inlet tube extending to the bottom of the flask. A total of 48.4 g. of ethylene oxide gas was then passed into the mixture at 25–30° C. while the mixture was being stirred. One hour after completion of this addition, another 48.4 g. of ethylene oxide was introduced at 9° C., and after stirring for 1 hour, the mixture was allowed to stand overnight. The mixture was then diluted with 400 ml. of water followed by 70 ml. of acetic acid and 5 ml. of concentrated hydrochloric acid. The upper layer was separated and the lower aqueous layer was extracted three times with ether. The combined organic layers were dried, the ether distilled off, and the residue fractionated to give 80.0 g. of α-

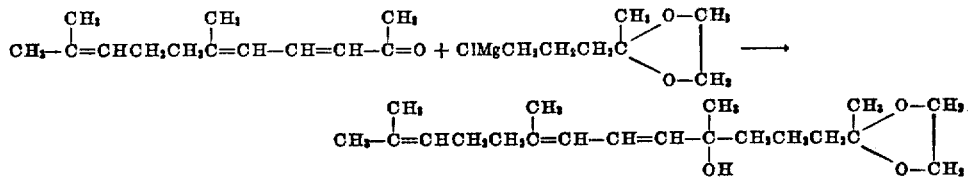

Equation 11

The carbinol produced in Equation 11 is then dehydrated by heating it with an acidic dehydration agent, the reaction being as follows with p-toluene sulfonic acid.

acetobutyrolactone having B. P.$_{18}$=125–138° C. The preparation of α-acetobutyrolactone can also be carried out using sodium dissolved in ethanol or in excess ethyl

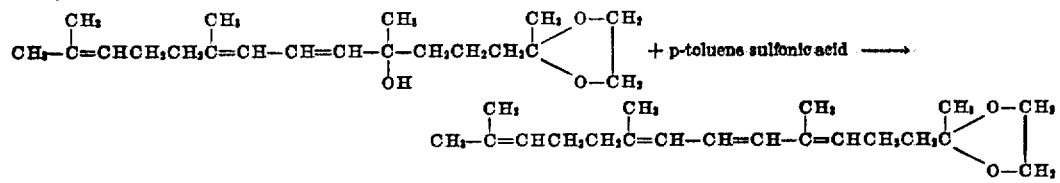

Equation 12

The dehydration, being of a carbinol having a conjugated double bonded system usually results in some formation of an isomer of the product of Equation 12 wherein the conjugated linkages are shifted to the left one position. Since the product of Equation 12 is then hydrogenated to saturate the molecule, the positioning of the unsaturated linkages is of no consequence, and hence the entire mixture of isomers is subjected to catalytic hydrogenation with hydrogen gas at 50 p. s. i. in the presence of a Raney nickel catalyst. The reaction proceeds as follows:

acetoacetate instead of the potassium hydroxide in diethyl carbitol.

*Example 2*

The α-acetobutyrolactone was then converted to 5-chloro-2-pentanone as follows. A 3-l., 3-neck flask equipped with two dropping funnels and an 18-inch Vigreux column connected to an efficient downward condenser was charged with 260 ml. of concentrated hydrochloric acid and 290 ml. of water. The mixture was

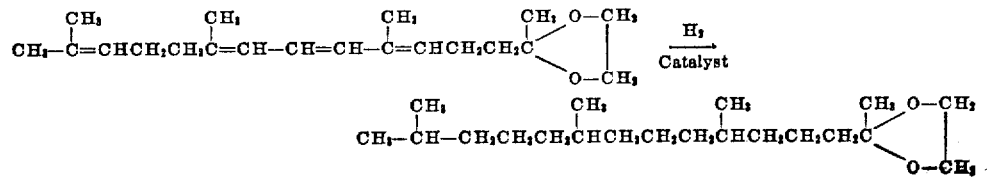

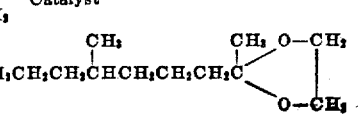

heated to boiling and 294 g. of α-acetobutyrolactone was added slowly from one funnel while additional aqueous hydrochloric acid mixture was added from the other funnel to maintain a constant volume. Water and 5-chloro-2-pentanone distilled out of the reaction mixture during the course of the reaction. The lower layer of distillate was separated and amounted to 221 g. of 5-chloro-2-pentanone which formed a yellow-orange 2,4-dinitrophenyl hydrazone melting at 126.5–127.5° C. Any of the other 5-halo-2-pentanones are prepared in like manner employing another hydrogen halide in place of the hydrochloric acid.

*Example 3*

A cyclic ketal of 5-chloro-2-pentanone was prepared as follows. A mixture of 80 g. of 5-chloro-2-pentanone, 45 g. of ethylene glycol, 120 ml. of benzene, and 1.25 g. of p-toluenesulfonic acid monohydrate was refluxed for 2 hours in a Dean-Stark apparatus, allowed to stand overnight, and then refluxed for an additional 90 minutes. The mixture was washed with dilute ammonium hydroxide and water, and the benzene distilled off. Fractionation of the residue gave 94.5 g. of 2-(γ-chloropropyl)-2-methyl-1,3-dioxolane having B. P.=94–97° C., $d_4^{25}$=1.098 and $n_D^{25}$=1.4480. Any desired cyclic alkylene ketal is readily prepared in the same way using the desired alkylene glycol, such as propylene glycol or butylene glycol, in place of the ethylene glycol. In like manner, the 5-chloro-2-pentanone can be replaced with any of the 5-halo-2-pentanones.

*Example 4*

As previously described, an active metal such as zinc, cadmium, mercury, magnesium or lithium reacts with the cyclic alkylene ketals of 5-halo-2-pentanone to give an organo-metallic complex. A typical preparation was as follows. To 15.3 g. of magnesium turnings and 30 ml. of dry ether in a 2-l., 3-neck flask fitted with a sealed stirrer, reflux condenser and dropping funnel, were added 1.9 ml. of methyl iodide. When a reaction started, a solution of 98.7 g. of 2(γ-chloropropyl)-2-methyl-1,3-dioxolane in 400 ml. of dry ether was added to the flask at a rate such as to maintain a smooth reflux over a period of 30 minutes whereby a 41.5% yield of

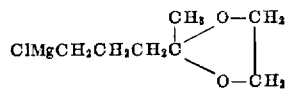

was obtained.

*Example 5*

To the product of Example 4 was added a solution of 121 g. of pseudo-ionone in 300 ml. of ether, the addition being carried out slowly until, suddenly, heat was no longer evolved and the reaction mixture turned brown. The mixture was decomposed with ice and ammonium chloride in the usual manner, the ether was distilled off and the residue was heated at 100° C. and 1 mm. pressure to remove a volatile by-product present in the mixture. The residue, consisting of the condensation product of the pseudo-ionone and the organo-halometallic complex (see Equation 11), weighed 74.7 g. and had $$E_{1cm.}^{1\%} (278 \text{ m}\mu) = 656$$

in ethanol indicating that partial dehydration of the carbinol had already occurred. The reaction detailed in this example is typical of the manner in which any other aldehyde or ketone is reacted with the organo-halometallic compounds of this invention. Thus, for example, the reaction proceeds in the same fashion with dimethyl ketone or the ketone of Equation 8 in place of pseudo-ionone.

*Example 6*

The dehydration of the carbinol produced in the preceding example was completed by dissolving 74.7 g. of the product in 300 ml. of benzene, adding 0.75 g. of p-toluene sulfonic acid monohydrate, warming the mixture to about 50° C. and letting it stand for 30 minutes. After washing the product with dilute ammonium hydroxide and water, the benzene was distilled off to given 75.0 g. of the unsaturated ketone dehydration product having $$E_{1cm.}^{1\%} (278 \text{ m}\mu) = 930$$

in ethanol. The infra-red spectrum showed no hydroxyl group and no pseudo-ionone. A 37.5 g. portion of the dehydration product was chromatographed from petroleum ether in a column of activated alumina. A lowermost, nearly colorless zone of the unsaturated ketone product separated from the more strongly adsorbed impurities, and on elution with ether gave 18.8 g. of product having $$E_{1cm.}^{1\%} (278 \text{ m}\mu) = 1340$$

in ethanol.

*Example 7*

An 18.8 g. portion of purified unsaturated ketonic dehydration product, as prepared in the preceding example, 125 ml. of ethanol, and ¾ teaspoon of settled Raney nickel mud were shaken in hydrogen at an initial pressure of 50 lbs. and at 17° C. In 10 min., the pressure had dropped to 40 lbs. and the temperature had risen to 30° C., following which, the uptake of hydrogen gas abruptly slowed down. The mixture was heated to 50° C. for an additional 85 minutes and hydrogen gas was added to bring the pressure up to 50 p. s. i. after an additional 40 minutes. Shaking was continued overnight at room temperature and the total uptake of hydrogen gas was 0.25 mole. The catalyst was filtered off and the alcohol removed from the filtrate leaving 18.8 g. of the cyclic ethylene ketal of phytyl ketone as a colorless oil. Infra-red analysis confirmed the saturation of the compound.

*Example 8*

A 36.6 g. portion of the cyclic ethylene ketal of phytyl ketone was stirred for 2 hours at 50° C. with 220 ml. of methanol, 55 ml. of water and 8 ml. of concentrated sulfuric acid. After cooling, the mixture was diluted with water and extracted with ether giving 31.6 g. of phytyl ketone as a nearly colorless oil showing a strong saturated carbonyl group by infra-red analysis and having B. P.=169–171° C. The semicarbazone, after recrystallization from ethanol, melted at 68–69° C.

Thus by means of this invention an isopentene group is added to a carbonyl compound and the isopentene group is readily hydrogenated to an isopentane group. The examples set out in detail the course of typical procedures embodying the invention. Other carbonyl compounds such as dimethyl ketone and methylheptenone or the like undergo the reactions in like fashion. The invention thus provides a simple and economical process for synthesizing terpenoid materials and yields ketones which are readily reactive in further steps of the synthesis.

While the invention has been described in considerable detail with reference to certain preferred embodiments thereof, it will be understood that variations and modifications can be effected within the spirit and scope of the invention as described hereinabove and as defined in the appended claims.

I claim:

1. In the synthesis of a terpenoid material by the combination of steps which include reacting a carbonyl compound with an organo-metallic complex of a ketal of 5-halo-2-pentanone to form a carbinol, and dehydrating and hydrolyzing the carbinol to a ketone, the step which comprises reacting a carbonyl compound of the formula

wherein R is an acyclic hydrocarbon radical and R' is a member of the group consisting of hydrogen and lower alkyl radicals, with an organo-metallic complex of an active metal selected from the class consisting of magnesium, lithium, zinc, cadmium and mercury and a ketal of 5-halo-2-pentanone, said reacting being effective to form a δ-carbinol of the formula

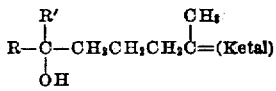

2. In the synthesis of a terpenoid material by the combination of steps which include reacting a carbonyl compound with an organo-metallic complex of a ketal of 5-halo-2-pentanone to form a carbinol, and dehydrating and hydrolyzing the carbinol to a ketone, the step which comprises reacting a carbonyl compound of the formula

wherein R is an acyclic hydrocarbon radical and R' is a member of the group consisting of hydrogen and lower alkyl radicals with a complex of an active metal selected from the group consisting of magnesium, lithium, zinc, cadmium and mercury, and a cyclic ketal of the formula

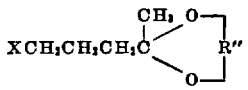

wherein X is a halogen atom and R" is a lower alkylene radical, said reacting being effective to form a carbinol of the formula

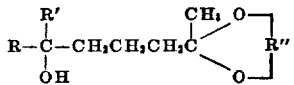

3. In the synthesis of a terpenoid material by the combination of steps which include reacting a carbonyl compound with an organo-metallic complex of a ketal of 5-halo-2-pentanone to form a carbinol, and dehydrating and hydrolyzing the carbinol thus formed to a ketone, the steps which comprise reacting a carbonyl compound of the formula

wherein R is an acyclic hydrocarbon radical and R' is a member selected from the group consisting of hydrogen and lower alkyl radicals with an organo-metallic complex of a metal selected from the group consisting of magnesium, lithium, zinc, cadmium and mercury and a ketal of the formula

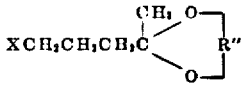

wherein X is a halogen atom and R" is a lower alkylene radical, said reacting being effective to form a carbinol of the formula

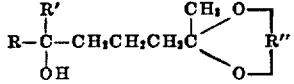

and thereafter dehydrating said carbinol to a cyclic ketal of the formula

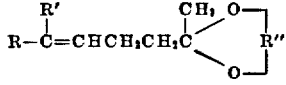

4. In the synthesis of a terpenoid material by reacting a carbonyl compound with an organo-metallic complex of a ketal to form a carbinol, and dehydrating and hydrolyzing the carbinol to a ketone, the steps which comprise reacting a cyclic alkylene ketal of 5-halo-2-pentanone with a metal selected from the class consisting of magnesium, lithium, zinc, cadmium and mercury and thereby forming an organo-metallic reagent, and reacting said reagent with a carbonyl compound of the formula

wherein R is an acyclic hydrocarbon radical and R' is a member of the group consisting of hydrogen and lower alkyl radicals.

5. In the synthesis including reacting a carbonyl compound with an organo-metallic complex of a ketal to form a carbinol, dehydrating said carbinol, and hydrolyzing the product thus formed to form a ketone, the steps which comprise forming an organo-metallic compound by reacting a cyclic alkylene ketal of 5-halo-2-pentanone with a metal selected from the class consisting of magnesium, lithium, mercury, cadmium and zinc, reacting said compound with a ketone of the formula

wherein R is an acyclic hydrocarbon radical and thereby forming a carbinol of the formula

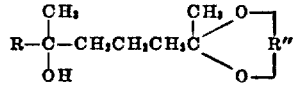

wherein R" is a lower alkylene radical, and dehydrating said carbinol to a cyclic ketal of the formula

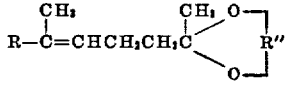

6. The synthesis of a terpenoid material which comprises reacting a ketone of the formula

wherein R is an acyclic hydrocarbon radical with an organo-metallic complex obtained by reacting an active metal selected from the class consisting of magnesium, lithium, zinc, cadmium and mercury with a cyclic ketal of the formula

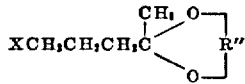

wherein X is a halogen atom and R" is a lower alkylene radical, said reacting being effective to form a carbinol of the formula

and converting said carbinol to a ketone of the formula

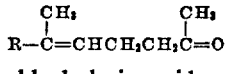

by dehydrating and hydrolyzing said carbinol.

7. The synthesis of a terpenoid material which comprises reacting dimethyl ketone with an organo-metallic complex obtained by reacting an active metal selected from the class consisting of magnesium, lithium, zinc, cadmium and mercury with a cyclic ketal of the formula

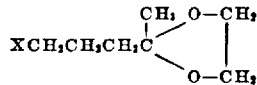

wherein X is a halogen atom, said reacting being effective to form a carbinol of the formula

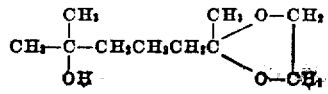

dehydrating said carbinol to a cyclic ketal of the formula

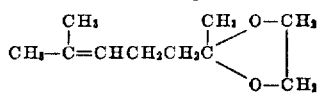

and hydrolyzing said cyclic ketal to a ketone of the formula

8. The synthesis of a terpenoid material which comprises reacting a ketone of the formula

with an organo-metallic complex obtained by reacting an active metal selected from the class consisting of magnesium, lithium, zinc, cadmium and mercury with a cyclic ketal of the formula

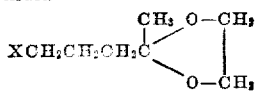

wherein X is a halogen atom to form a carbinol of the formula

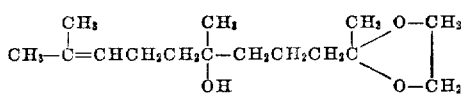

and dehydrating and hydrolyzing said carbinol to a ketone of the formula

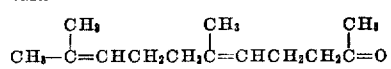

9. As a new compound, an organo-metallic compound of a lower alkylene cyclic ketal of 5-halo-2-pentanone with a metal selected from the group consisting of magnesium, lithium, cadmium, mercury and zinc.

10. As a new compound, a substance of the formula

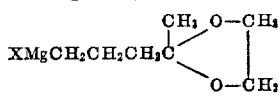

wherein X is a halogen atom.

11. As a new chemical compound, a carbinol of the formula

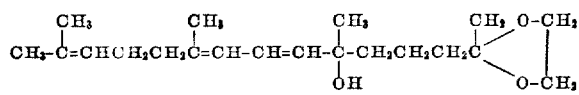

12. As a new chemical compound, an unsaturated cyclic ketal of the formula

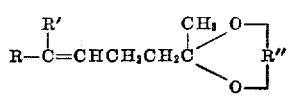

wherein R is an acyclic hydrocarbon radical, R' is a member selected from the group consisting of hydrogen and lower alkyl radicals, and R'' is a lower alkylene radical.

13. As a new compound, an unsaturated cyclic ketal of the formula

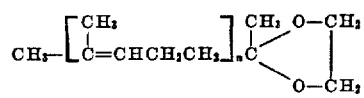

wherein n is an integer of the series consisting of 1 and 2.

14. As a new compound, an unsaturated cyclic ketal of the formula

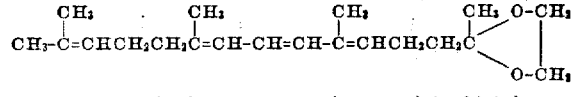

15. The synthesis of a terpenoid material which is convertible to phytyl ketone by hydrogenation which comprises reacting pseudo-ionone with an organo-metallic complex obtained by reacting an active metal selected from the class consisting of magnesium, lithium, zinc, cadmium and mercury with a cyclic ketal of the formula

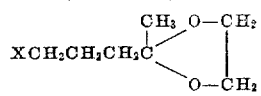

wherein X is a halogen atom, to form a carbinol of the formula

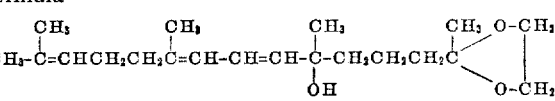

dehydrating said carbinol to a terpenoid ketal of the formula

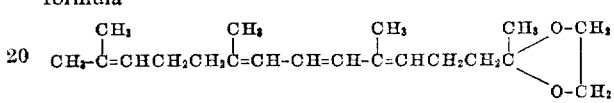

and hydrolyzing said terpenoid ketal to a ketone of the formula

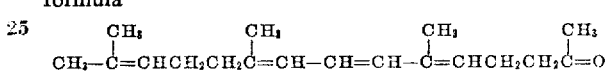

16. The synthesis of a terpenoid material which comprises reacting a carbonyl compound of the formula

wherein R is an acyclic hydrocarbon radical and R' is a member of the group consisting of hydrogen and lower alkyl radicals, with an organo-metallic complex obtained by reacting an active metal selected from the class consisting of magnesium, lithium, zinc, cadmium and mercury with a ketal of 5-halo-2-pentanone, said reacting being effective to form a δ-carbinol of the formula

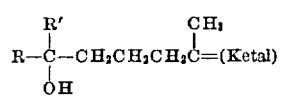

dehydrating said carbinol to a compound of the formula

and hydrolyzing the resulting dehydrated product to a ketone of the formula

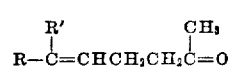

17. In the synthesis of a terpenoid material by the combination of steps which includes reacting a carbonyl compound with an organo-metallic complex of a ketal of 5-halo-2-pentanone to form a carbinol, and dehydrating and hydrolyzing the carbinol to a ketone, the step which comprises reacting acetone with a complex of an active metal selected from the group consisting of magnesium, lithium, zinc, cadmium and mercury, and a ketal of the formula

wherein X is a halogen atom, said reacting being effective to form a carbinol of the formula

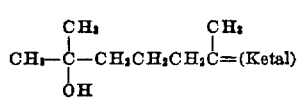

18. In the synthesis of a terpenoid material by the combination of steps which comprises reacting a carbonyl compound with an organo-metallic complex of a ketal of 5-halo-2-pentanone to form a carbinol, and dehydrating and hydrolyzing the carbinol to a ketone, the step which comprises reacting a carbonyl compound of the formula $$R-\underset{\underset{}{\overset{CH_3}{|}}}{C}=O$$

wherein R is an acyclic hydrocarbon radical, with a complex of an active metal selected from the group consisting of magnesium, lithium, zinc, cadmium and mercury, and a ketal of the formula $$XCH_2CH_2CH_2\underset{\underset{}{\overset{CH_3}{|}}}{C}=(Ketal)$$

wherein X is a halogen atom, said reacting being effective to form a carbinol of the formula $$R-\underset{\underset{OH}{|}}{\overset{\overset{CH_3}{|}}{C}}-CH_2CH_2CH_2\underset{}{\overset{CH_3}{\underset{|}{C}}}=(Ketal)$$

19. In the synthesis of a terpenoid material by the combination of steps which comprises reacting a carbonyl compound with an organo-metallic complex of a ketal of 5-halo-2-pentanone to form a carbinol, and dehydrating and hydrolyzing the carbinol to a ketone, the step which comprises reacting pseudo ionone with a complex of an active metal selected from the group consisting of magnesium, lithium, zinc, cadmium and mercury, and a ketal of the formula $$XCH_2CH_2CH_2\underset{\underset{}{\overset{CH_3}{|}}}{C}=(Ketal)$$

wherein X is a halogen atom, said reacting being effective to form a carbinol of the formula $$CH_3-\overset{CH_3}{\underset{|}{C}}=CHCH_2CH_2\overset{CH_3}{\underset{|}{C}}=CH-CH=CH-\underset{\underset{OH}{|}}{\overset{\overset{CH_3}{|}}{C}}-CH_2CH_2CH_2\overset{CH_3}{\underset{|}{C}}=(Ketal)$$

20. In the synthesis of a terpenoid material by the combination of steps which include reacting a carbonyl compound with an organo-metallic complex of a ketal of 5-halo-2-pentanone to form a carbinol, and dehydrating and hydrolyzing the carbinol to a ketone, the step which comprises reacting a carbonyl compound of the formula $$R-\underset{\underset{}{\overset{R'}{|}}}{C}=O$$

wherein R is an acyclic hydrocarbon radical and R' is a member of the group consisting of hydrogen and lower alkyl radicals, with an organo-metallic complex of an active metal selected from the class consisting of magnesium, lithium, zinc, cadmium and mercury, and a ketal of 5-halo-2-pentanone, said reacting being effective to form a δ-carbinol of the formula $$R-\underset{\underset{OH}{|}}{\overset{\overset{R'}{|}}{C}}-CH_2CH_2CH_2\overset{CH_3}{\underset{}{C}}\underset{O-CH_2}{\overset{O-CH_2}{<}}$$

21. In the synthesis of a terpenoid material by the combination of steps which include reacting a carbonyl compound with an organo-metallic complex of a ketal of 5-halo-2-pentanone to form a carbinol, and dehydrating and hydrolyzing the carbinol to a ketone, the step which comprises reacting a carbonyl compound of the formula $$R-\underset{\underset{}{\overset{R'}{|}}}{C}=O$$

wherein R is an acyclic hydrocarbon radical and R' is a member of the group consisting of hydrogen and lower alkyl radicals, with an organo-metallic complex of an active metal selected from the class consisting of magnesium, lithium, zinc, cadmium and mercury, and a ketal of 5-halo-2-pentanone, said reacting being effective to form a δ-carbinol of the formula $$R-\underset{\underset{OH}{|}}{\overset{\overset{R'}{|}}{C}}-CH_2CH_2CH_2\overset{CH_3}{\underset{}{C}}\underset{O-CH_3}{\overset{O-CH_3}{<}}$$

22. In the synthesis of a terpenoid material by the combination of steps which include reacting a carbonyl compound with an organo-metallic complex of a ketal of 5-halo-2-pentanone to form a carbinol, and dehydrating and hydrolyzing the carbinol to a ketone, the step which comprises reacting a carbonyl compound of the formula $$R-\underset{\underset{}{\overset{R'}{|}}}{C}=O$$

wherein R is an acyclic hydrocarbon radical and R' is a member of the group consisting of hydrogen and lower alkyl radicals, with an organo-metallic complex of an active metal selected from the class consisting of magnesium, lithium, zinc, cadmium and mercury, and a ketal of 5-halo-2-pentanone, said reacting being effective to form a δ-carbinol of the formula $$R-\underset{\underset{OH}{|}}{\overset{\overset{R'}{|}}{C}}-CH_2CH_2CH_2\overset{CH_3}{\underset{}{C}}\underset{O-CH_3}{\overset{O-CH_3}{<}}$$

23. In the synthesis of a terpenoid material by the combination of steps which comprises reacting a carbonyl compound with an organo-metallic complex of a ketal of 5-halo-2-pentanone to form a carbinol, and dehydrating and hydrolyzing the carbinol to a ketone, the step which comprises reacting a carbonyl compound of the formula $$CH_3(\overset{CH_3}{\underset{|}{C}}=CHCH_2CH_2)_n-\overset{CH_3}{\underset{|}{C}}=O$$

wherein n is an integer of the series consisting of 0, 1 and 2, with a complex of an active metal selected from the group consisting of magnesium lithium, zinc, cadmium and mercury, and a ketal of the formula $$XCH_2CH_2CH_2\underset{\underset{}{\overset{CH_3}{|}}}{C}=(Ketal)$$

wherein X is a halogen atom, said reacting being effective to form a carbinol of the formula $$CH_3(\overset{CH_3}{\underset{|}{C}}=CHCH_2CH_2)_n-\underset{\underset{OH}{|}}{\overset{\overset{CH_3}{|}}{C}}CH_2CH_2CH_2\overset{CH_3}{\underset{|}{C}}=(Ketal)$$

24. In the synthesis of a terpenoid material by the combination of steps which comprises reacting a carbonyl compound with an organo-metallic complex of a ketal of 5-halo-2-pentanone to form a carbinol, and dehydrating and hydrolyzing the carbonol to a ketone, the step which comprises reacting a carbonyl compound of the formula $$CH_3(\overset{CH_3}{\underset{|}{C}}=CHCH_2CH_2)_n-\overset{CH_3}{\underset{|}{C}}=O$$

wherein n is an integer of the series consisting of 0, 1 and 2, with a complex of magnesium and a ketal of the formula $$XCH_2CH_2CH_2\overset{CH_3}{\underset{}{C}}\underset{O\rule{0.3cm}{0.15mm}}{\overset{O\rule{0.3cm}{0.15mm}}{<}}R$$

wherein X is a halogen atom and R is a lower alkylene radical, said reacting being effective to form a carbinol of the formula $$CH_3(\overset{CH_3}{\underset{|}{C}}=CHCH_2CH_2)_n-\underset{\underset{OH}{|}}{\overset{\overset{CH_3}{|}}{C}}-CH_2CH_2CH_2\overset{CH_3}{\underset{}{C}}\underset{O\rule{0.3cm}{0.15mm}}{\overset{O\rule{0.3cm}{0.15mm}}{<}}R$$

(References on following page)

References Cited in the file of this patent

UNITED STATES PATENTS

| | | |
|---|---|---|
| 2,352,568 | Reichstein | June 27, 1944 |
| 2,369,160 | Milas | Feb. 13, 1945 |
| 2,421,090 | Smith et al. | May 27, 1947 |
| 2,432,601 | Wiley | Dec. 16, 1947 |
| 2,499,257 | Picha | Feb. 28, 1950 |
| 2,676,988 | Robeson | Apr. 27, 1954 |

OTHER REFERENCES

Leutner: Chemical Abstracts 26, col. 5820 (1932).
Kuhn: J. fur. prokt. Chem. 156, pp. 103–125 (1940).
Willimann et al.: Helv. Chem. Acta 32, pp. 2154–2157 (1949).
Barnard et al.: J. Chem. Soc., 1950, p. 918.
Arens at al.: Rec. trav. chim. 67, pp. 975, 977 (1948).
Chem. Abst., vol. 6, p. 349 (1912).
Hamonet Compt. render 138, pp. 975–7 (1904).

UNITED STATES PATENT OFFICE
Certificate of Correction

Patent No. 2,816,117

December 10, 1957

John D. Cawley

It is hereby certified that error appears in the printed specification of the above numbered patent requiring correction and that the said Letters Patent should read as corrected below.

Column 10, line 4, for "given" read —give—; column 13, lines 47 to 50, inclusive, claim 11, right-hand portion of the formula should appear as shown below instead of as in the patent—

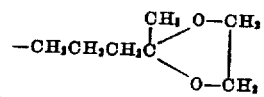

column 16, lines 24 to 28, inclusive, claim 22, the formula should appear as shown below instead of as in the patent—

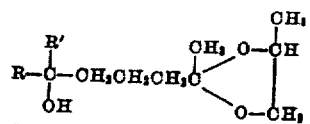

line 33, for "carbonol" read —carbinol—; column 16, lines 47 to 50, inclusive, claim 23, the right-hand portion of the formula should appear as shown below instead of as in the patent—

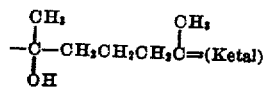

same column, line 55, for "carbonol" read —carbinol—.

Signed and sealed this 25th day of March 1958.

[SEAL]

Attest:
KARL H. AXLINE,
*Attesting Officer.*

ROBERT C. WATSON,
*Commissioner of Patents.*